UNITED STATES PATENT OFFICE.

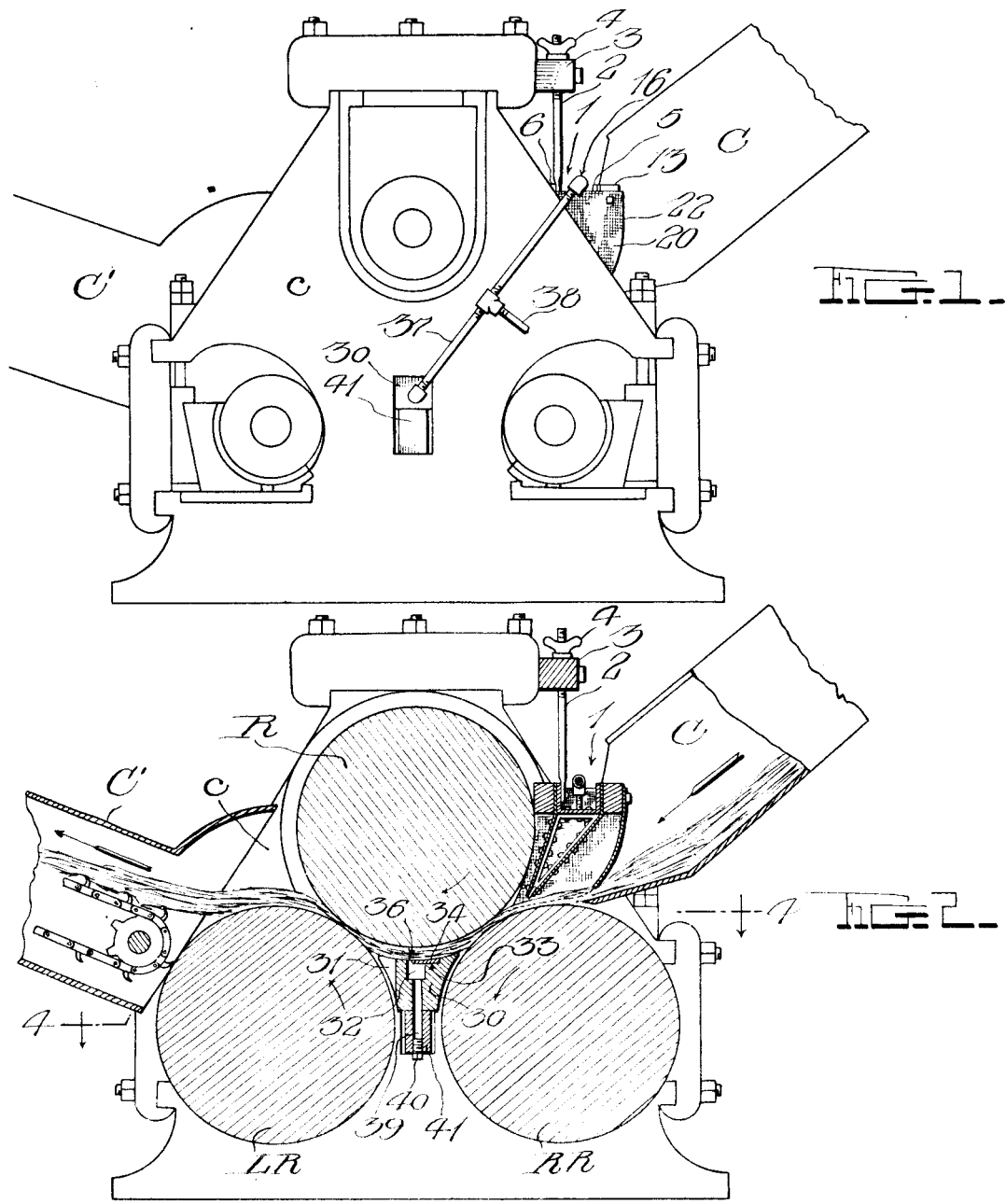

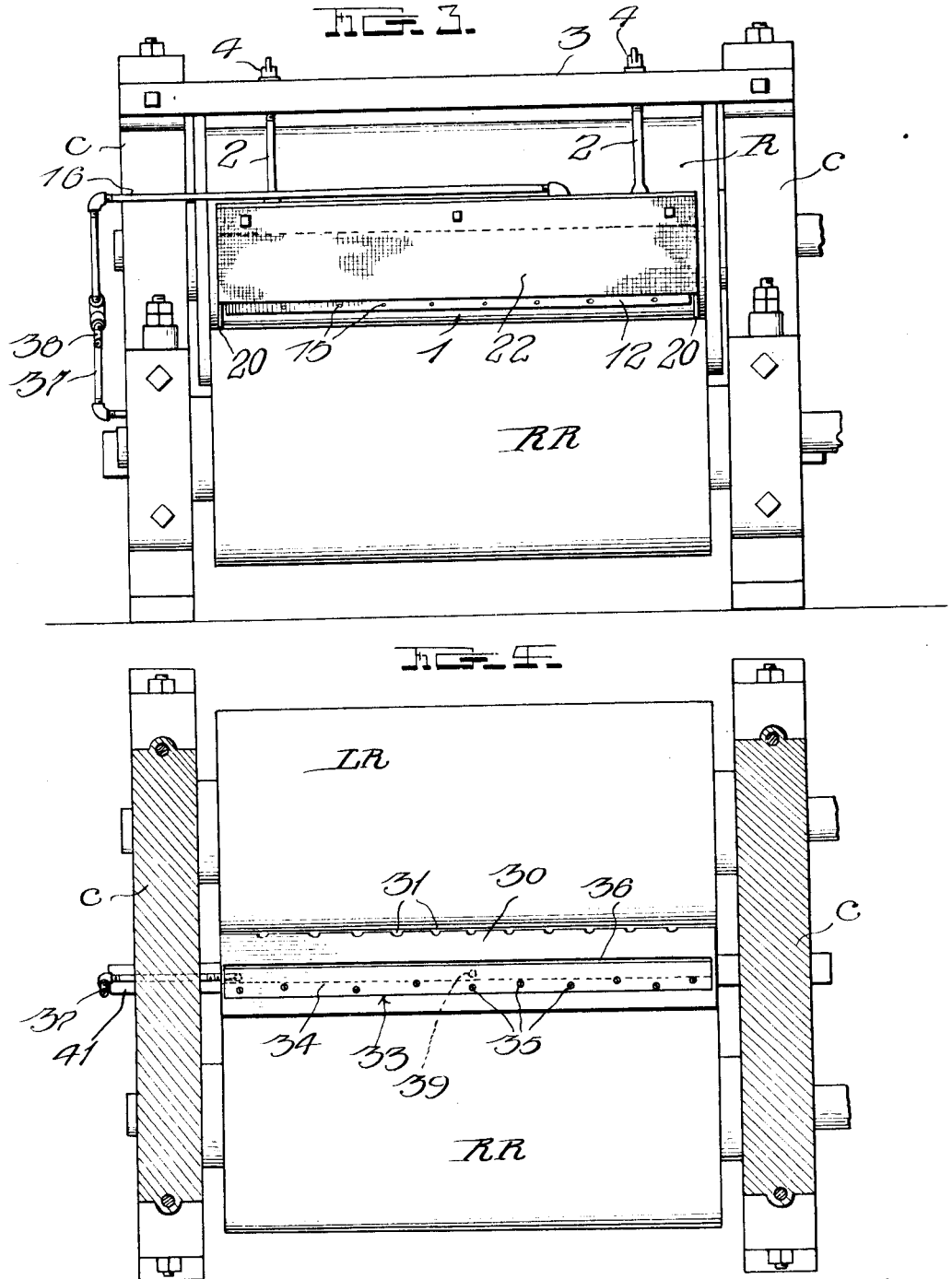

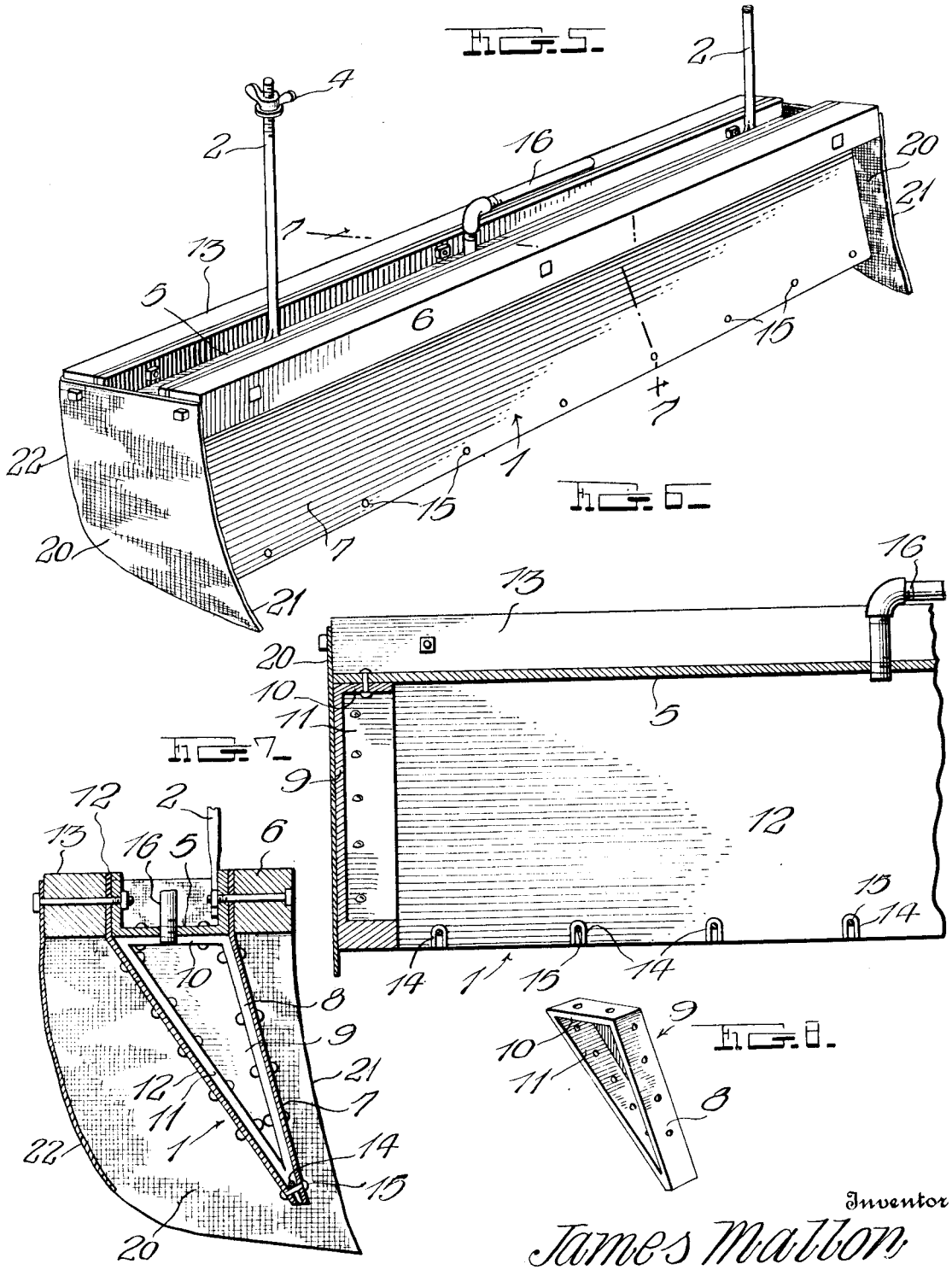

JAMES MALLON, OF NEW ORLEANS. LOUISIANA.

STEAMING APPARATUS FOR CANE-MILLS.

1,180,517.  Specification of Letters Patent.  Patented Apr. 25, 1916.

Application filed March 18, 1915. Serial No. 15,285.

*To all whom it may concern:*

Be it known that I, JAMES MALLON, a citizen of the United States, residing at New Orleans, in the parish of Orleans and State of Louisiana, have invented certain new and useful Improvements in Steaming Apparatus for Cane-Mills; and I do declare the following to be a full, clear, and exact description of the invention, such as will enable others skilled in the art to which it appertains to make and use the same.

My invention relates to improvements in steaming apparatus for use in connection with cane mills, and has for its object to provide a device of this class which will be very efficient in operation, readily producing the numerous advantageous results gained by steaming the cane being crushed, such advantage being well known to those skilled in the art to which the invention relates.

With this object in view, the invention resides in certain novel features of construction and combination hereinafter described and claimed, one embodiment of the invention being shown in the accompanying drawings wherein:

Figure 1 is a side elevation of a portion of a cane mill showing the application of the invention to use; Fig. 2 is a vertical longitudinal section; Fig. 3 is an end view; Fig. 4 is a horizontal section taken substantially on the line 4—4 of Fig. 2; Fig. 5 is a perspective view of a steam casing to be described; Fig. 6 is a detail longitudinal section through a portion of this casing; Fig. 7 is a vertical transverse section thereof as seen on the line 7—7 of Fig. 5; and, Fig. 8 is a detail perspective of one of the triangular end walls of the casing.

In these drawings constituting a part of the application c designates the two upright cheeks of a cane mill, R the upper crushing roller thereof, LR the lower left hand crushing roller, and RR the lower right hand roller. Into the space between the rollers R and RR the cane from which the juice is to be extracted, is fed through the flat bottomed chute C, while the cane from which the juice has been removed, or the bagasse as it is known in the art, is conveyed from the machine by an appropriate type of carrier C'.

The parts so far described form no part of the present invention and are merely illustrated for the purpose of disclosing the application of the invention to use, the construction of mills of the type shown in the drawings being well known, as is likewise the mode of operation thereof.

Disposed in parallel relation to the rollers R and RR, and spaced slightly toward the chute C therefrom, is a steam casing 1 from which a pair of upright rods 2 rise, said rods being passed through a transverse bar 3 supported in any suitable manner by the cheeks c, and having nuts 4 on their upper ends, whereby rotation of said nuts will vary the height of the casing 1. In order to relieve unnecessary confusion, the reference numerals 1, 2, 3 and 4 only, have been placed on Fig. 2, since the details of the casing 1 and the parts closely associated therewith, are clearly disclosed in other and larger figures of the drawings.

As seen most clearly in Figs. 5, 6 and 7, the lower ends of the upright rods 2 are secured to one upright flange of a transverse channel iron bar 5, a longitudinally extending packing strip 6 being likewise secured to said flange and being adapted for contact with the roller R when the invention is applied to use. It will be noted, however, that the upper edge of one of the transversely extending side walls 7 of the steam casing 1 is clamped between the aforesaid flange and the strip 6, this wall inclining downwardly and laterally to a certain extent and being secured at its ends to inwardly extending flanges 8 which are formed on triangular end castings 9, the latter having additional flanges 10 on their upper ends which are secured to the lower side of the bar 5. The remaining edges of the castings 9 are equipped with additional inwardly extending flanges 11 to which the other longitudinally disposed side wall 12 of the steam casing 1 is secured at its ends, the upper edge of said wall 12 being clamped between the remaining upright flange of the bar 5 and a transversely extending strip 13 which is preferably constructed of wood, as is likewise the strip 6 previously described.

As shown most clearly in Figs. 6 and 7, the lower edges of the side plates 7 and 12 are spaced from each other by a plurality of U-shaped wire spacing members 14 through which and through the said lower edges, rivets 15 pass whereby to retain said edges in properly spaced relation.

By constructing the steam casing in the manner above described, it will be evident, as shown in Fig. 2, that the pointed lower side thereof may be disposed in very close relation to the rollers R and RR, thereby allowing steam fed into the casing through an appropriate steam pipe 16, to be discharged from the lower side thereof in a sheet extending transversely of the mill, this steam being now projected upon the cane being fed to said mill and producing numerous advantageous results such as those gained by the vast number of steaming devices heretofore applied to use. It is to be observed, however, that by the provision of the steam casing 1, a predetermined amount of steam is trapped at all times therein, thus insuring that a steady sheet be projected from the lower side of said casing against the incoming cane, this being very advantageous.

In connection with the parts so far described, a pair of flexible end walls 20 is secured to the ends of the strips 6 and 13 and in contact with the end castings 9 of the steam casing 1, one edge of these flexible end walls being continued in one direction and curved as seen at 21 for contact with the periphery of the upper roller R, while the other edge of such walls is continued in the opposite direction and is connected to a flexible transverse wall 22 which is secured to and depends from the strip 13, the ends of the walls 22 being secured in any appropriate manner to the edges of the end walls 20. It will be noted by references to Figs. 2 and 7 of the drawings, that the wall 22 terminates at such a point as to readily allow the incoming cane to pass thereunder. Said wall, however, operates in conjunction with the two ends 20 to constitute a steam jacket substantially surrounding the casing 1 and adapted to prevent the escape of steam in any direction other than inwardly between the rollers R and RR. By this provision, it will be seen that all of the steam is directed to the point at which it becomes most efficient. Furthermore, some of said steam will be at all times trapped between the walls 20 and 22 thus providing an additional volume of steam to the action of which, the incoming cane is subjected.

In the drawings, the flexible end walls 20 are shown as having curved edges adapted to abut the roller R when the device is applied with the packing strip 6 likewise in contact with said roller, this construction being advantageous, since by its use, all tendency on the part of the end walls 20 to be blown outwardly by the force of the steam housed therein is resisted by the flanges on the ends of the roller R.

Operating in conjunction with the invention as before described, is a turn plate 30 seen more particularly in Figs. 2 and 4, this plate 30 having the usual curved upper side and upright notches 31 in one of its edges, this edge being here shown as disposed contiguous to the roller LR. In the present case, the plate 30 is shown as provided with a longitudinally extending steam channel 32 at its upper side and with a longitudinally extending groove 33 which enters one side of said channel and in which a plate 34 is secured by screws 35. It will be noted, however, that the plate 34 is so positioned as to leave a longitudinally extending slot 36 through which steam may be discharged from the turn plate against the cane passing thereover.

For supplying steam to the channel 32, a pipe 37 is shown as connected with the pipe 16 previously described, steam being fed to the two by a supply pipe 38 (see more particularly Fig. 1). In the present instance, the pipe 37 is shown as entering one end of the channel 32, but since in some machines it is impossible to so dispose said pipe, an upright port 39 normally closed by a screw plug 40, is provided, said port leading downwardly from the channel 32 and through the usual transverse supporting bar 41.

I have found by actual experience, that by projecting the steam in a sheet, against the cane, much better results are obtained than when the same is projected in independent jets, it being therefore evident that the steam casing 1 as well as the turn plate 30 will accomplish the desired results to perfection.

I claim:

1. The combination with a cane mill including upper and lower rollers, of a steam casing lying parallel to the upper roller and having a steam outlet near the lower side thereof, a packing strip carried by the top of the casing and bearing frictionally against said upper roller and a pair of steam tight end walls carried by said casing and projecting therefrom into contact with the aforesaid upper roller.

2. The combination with a cane mill including upper and lower rollers, of a steam casing lying parallel to the upper roller and having a steam outlet near the lower side thereof, a packing strip carried by the top of the casing and bearing frictionally against said upper roller and a pair of steam tight end walls carried by said casing, projecting therefrom, and having curved edges abutting the periphery of the upper roller to prevent the escape of steam.

3. The combination with a cane mill including a crushing roller, of a steam casing lying parallel to said roller and having an outlet near the same, and a pair of steam tight end walls carried by the casing and bearing against the roller to prevent the escape of steam.

4. The combination with a cane mill including a roller, of a steam casing lying parallel to said roller and having an outlet near the same, and a pair of steam tight end walls carried by the casing and having curved edges bearing against the periphery of the roller to prevent the escape of steam.

5. The combination with a cane mill including upper and lower rollers, of a steam casing lying parallel to the upper roller and having a steam outlet near the lower side thereof, a packing strip carried by the top of the casing and bearing frictionally against said upper roller, a pair of steam tight end walls carried by the casing and continuing therefrom in opposite directions, one edge of said end walls being disposed in contact with the aforesaid upper roller, and a longitudinally extending wall depending from the side of the casing remote from the roller and connected at its ends to the other edge of said end walls.

6. The combination with a cane mill including upper and lower crushing rollers, of a steam casing lying parallel to and spaced from the upper roller, said casing having a steam outlet at its lower end, and a flexible steam jacket substantially surrounding said casing and having an open lower side.

7. The combination with a cane mill including upper and lower rollers, of a transversely extending supporting member lying parallel with the upper roller and frictionally contacting therewith, a steam casing depending from said supporting member and having an outlet at its lower side, and end walls extending from the ends of the steam casing and abutting the roller to prevent the escape of steam.

8. The combination with a cane mill including upper and lower rollers, of a transversely extending supporting member lying parallel with the upper roller, hangers rising from said supporting member, nuts on the upper ends of said hangers, means carried by the mill receiving said hangers, and a steam casing depending from the supporting member and having a discharge opening in its lower side.

9. The combination with a cane mill including upper and lower rollers, of a transversely extending supporting member lying parallel with the upper roller and abutting one side thereof, a steam casing depending from said supporting member and having an outlet in its lower side, a pair of end walls depending from the ends of the supporting member and continuing in opposite directions, one edge of said walls being disposed in contact with the upper roller, and an additional and transversely extending wall depending from the edge of the supporting member remote from the roller and secured at its ends to the free edge of the aforesaid end walls.

10. A turn plate having a longitudinally extending steam channel in its upper side, means for supplying steam to said channel and a longitudinally extending plate inset in the upper side of the turn plate and having a straight edge spaced from one side wall of the channel, whereby to provide a longitudinally extending steam discharge slot.

In testimony whereof I have hereunto set my hand in presence of two subscribing witnesses.

JAMES MALLON.

Witnesses:
 ROBERT LEGER,
 O. AILE MUSSOW.